Feb. 11, 1936. G. L. CUNNINGHAM Re. 19,849

PROCESS FOR THE PRODUCTION OF CHLORINE DIOXIDE

Original Filed Feb. 2, 1934

INVENTOR
George L. Cunningham
BY
Pennie, Davis, Marvin & Edmonds
ATTORNEYS

Reissued Feb. 11, 1936 Re. 19,849

UNITED STATES PATENT OFFICE 19,849

PROCESS FOR THE PRODUCTION OF CHLORINE DIOXIDE

George Lewis Cunningham, Niagara Falls, N. Y., assignor to The Mathieson Alkali Works, Inc., New York, N. Y., a corporation of Virginia Original No. 2,008,388, dated July 16, 1935, Serial No. 709,482, February 2, 1934. Application for reissue December 7, 1935, Serial No. 53,438

3 Claims. (Cl. 23—205)

Figure 1:
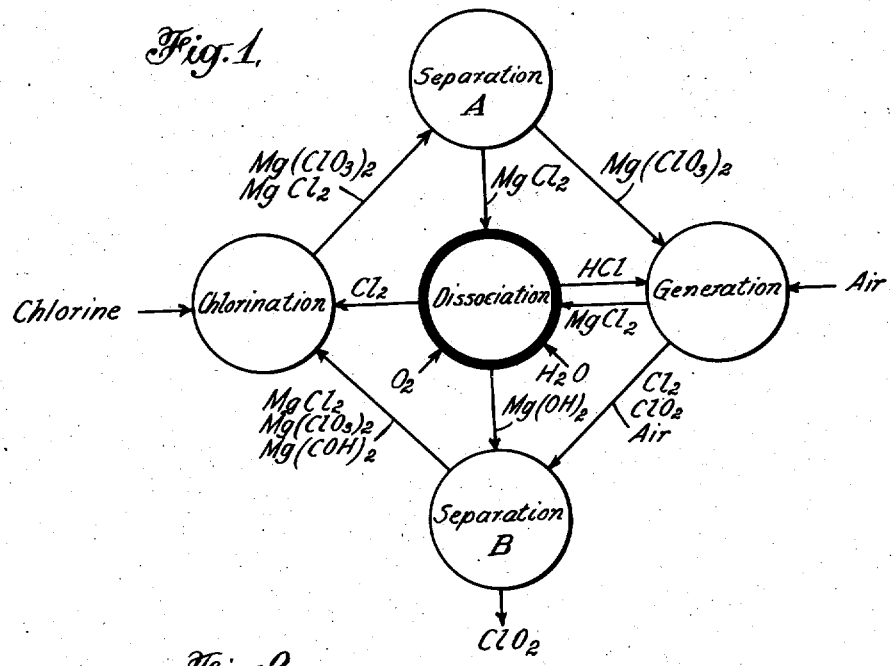

This invention relates to improvements in the production of chlorine dioxide, $ClO_2$. More particularly, the invention comprises a combination of steps forming a cyclic process for the conversion of chlorine to chlorine dioxide. The process of the invention has several advantages. High efficiencies in the conversion of chlorine to chlorine dioxide can be attained. Chlorine, air and water are the only necessary raw materials, excepting fuel for heat and power. The process can be carried on to produce chlorine dioxide as the sole product without the production of waste products involving problems of loss and disposal.

The operation of the process of the invention depends upon a reaction of magnesium chloride which distinguishes it from the chlorides of the alkaline earth metals and the alkali metals. This reaction is the thermal dissociation of magnesium chloride, in the presence of free oxygen, to form magnesium oxide, chlorine and hydrochloric acid. For example, at a temperature approximating 600°–700° C., magnesium chloride dihydrate dissociates in the presence of free oxygen to form magnesium oxide, chlorine and hydrochloric acid, the reaction being illustrated by the following type equation:

$$4MgCl_2.2H_2O+O_2 \rightarrow 4MgO+2Cl_2+4HCl+6H_2O$$

This invention takes advantage of this reaction peculiar to magnesium chloride to combine a number of steps in a unitary process. The relation of the dissociation step embodying this reaction to the combination is illustrated, diagrammatically, in Figure 1 of the accompanying drawing, to which more detailed reference is made below.

The process of the invention comprises, as essential steps (1) separation of magnesium chloride and magnesium chlorate from a mixture of the same, (2) dissociation of magnesium chloride in the presence of free oxygen to form magnesium oxide, chlorine and hydrochloric acid, (3) generation of a gas mixture including chlorine and chlorine dioxide by reaction of magnesium chlorate with hydrochloric acid (4) separation of chlorine from a gas mixture including chlorine and chlorine dioxide by reacting the gas mixture with magnesium hydroxide and (5) chlorinating magnesium hydroxide, together with magnesium chloride and magnesium chlorate, to form a mixture of magnesium chlorate and magnesium chloride. In the process of this invention, these steps are combined as follows: Magnesium chloride from the 1st step is supplied to the 2nd step and magnesium chlorate from the 1st step is supplied to the 3rd step, hydrochloric acid from the 2nd step is supplied to the 3rd step, chlorine from the 2nd step is supplied to the 5th step and magnesium hydroxide formed by hydration of magnesium oxide from the 2nd step is supplied to the 4th step, the gas mixture including chlorine and chlorine dioxide from the 3rd step is supplied to the 4th step, magnesium hydroxide formed by hydration of magnesium oxide from the 2nd step together with magnesium chloride and magnesium chlorate formed in the 4th step is supplied to the 5th step, and magnesium chlorate and magnesium chloride from the 5th step are supplied to the 1st step. Magnesium chloride formed in the 3rd step is with advantage returned to the 2nd step. Chlorine is supplied to the 5th step and chlorine dioxide is recovered from the 4th step. Again referring for the purpose of illustration to Figure 1 of the accompanying drawing, the 1st step is the "separation A", the 2nd step is the "dissociation", the 3rd step is the "generation" the 4th step is the "separation B" and the 5th step is the "chlorination".

The separation of magnesium chlorate from magnesium chloride in the 1st step of the combined operation may be carried out in any convenient manner. For example, this separation may be effected by fractional crystallization of the chloride from the chlorate, the latter being relatively more soluble. This separation is, however, with advantage effected as described in my application filed February 9, 1934, Serial Number 710,530. As there described, the separation is effected by extraction of magnesium chlorate from the mixture in acetone. For example, an aqueous solution containing magnesium chloride and magnesium chlorate, in a molecular ratio, $MgCl_2:Mg(ClO_3)_2$, of about 5 : 1, from the chlorination is concentrated until the molecular ratio of water present to magnesium chloride and magnesium chlorate, $H_2O:MgCl_2+Mg(ClO_3)_2$, does not exceed about 6 : 1, and the resulting solid mixture is subjected to countercurrent extraction with acetone at a temperature below about 35° C. After evaporation of the acetone for reuse in the extraction, magnesium chlorate containing not more than 10% (by weight) of magnesium chloride can be recovered from the extract, the balance of the magnesium chloride being recovered as the extraction residue.

In the second step of the combined operation, magnesium chloride is dissociated at a temperature approximating 600°–700° C. in the presence of free oxygen, in the form of air for example.

The magnesium chloride is with advantage supplied to this operation containing at least as much water as corresponds to the dihydrate, $MgCl_2.2H_2O$, but not much more. Reduction of the water content below this point tends to involve loss of hydrochloric acid in the dissociation. The magnesium chloride separated in the first step, and magnesium chloride formed in the 3rd step with advantage added to the magnesium chloride from the 1st step, may be dried to this extent by heating to a temperature upwards of 400° C. for example. Spray-drying in direct heat exchange with hot furnace gases is advantageous in this connection. The dissociation may be carried out in any convenient manner, for example by passing the dihydrate through a kiln, a rotary kiln for example, countercurrent to hot furnace gases, from the combustion of coal or coke for example, containing excess air sufficient for the dissociation reaction. The consequent admixture of carbon dioxide with the chlorine formed in the 2nd step assists the chlorination in the 5th step. Magnesium oxide is recovered as a solid residue and the chlorine and hydrochloric acid formed are evolved as gases. Hydrochloric acid is separated from this gas mixture by cooling the gas mixture and contacting it with water to recover the hydrochloric acid as concentrated aqeuous hydrochloric acid in the conventional manner. The remaining gas mixture, including the chlorine formed in the dissociation, is supplied to the 5th step.

The generation of a gas mixture including chlorine and chlorine dioxide in the 3rd step is effected by reacting the magnesium chlorate from the 1st step with hydrochloric acid from the 2nd step. The magnesium chlorate supplied to the generation should contain a minimum of magnesium chloride and in no event should the molecular ration $MgCl_2:Mg(ClO_3)_2$ exceed 2:1. The magnesium chlorate is with advantage supplied to the generation as a concentrated solution in which the molecular ratio $Mg(ClO_3)_2:H_2O$ approximates 1:4–6. The generation reaction is with advantage carried out in an aqueous solution subjected to aeration. The volume of air used should be such that the partial pressure of chlorine dioxide in the resulting gas mixture does not substantially exceed 25–30 mm. of mercury at standard conditions. By so diluting the chlorine dioxide produced, danger of explosion is minimized. The reaction efficiency is also improved. The following type equation illustrates the principal reaction occurring:

$$Mg(ClO_3)_2+4HCl\rightarrow MgCl_2+Cl_2+2ClO_2+2H_2O.$$

The following type equation illustrates a side reaction which also occurs:

$$Mg(ClO_3)_2+12HCl\rightarrow MgCl_2+6Cl_2+6H_2O.$$

Using magnesium chlorate substantially free from magnesium chloride and an amount of hydrochloric acid exceeding that stochiometrically required by about 16%, as much as 85%–90% or more of the chlorine supplied to the generation as magnesium chlorate is recovered as chlorine dioxide. The magnesium chloride solution produced in the generation reaction is with advantage supplied to the 2nd step with the magnesium chloride from the 1st step, as described above. Any free hydrochloric acid in this solution is neutralized with part of the magnesium oxide from the 2nd step before this solution is returned to the 2nd step.

The separation in the 4th step of chlorine from the gas mixture, including chlorine and chlorine dioxide, from the 3rd step is with advantage effected by reacting this gas mixture with substantially dry magnesium hydroxide formed by hydration of magnesium oxide from the 2nd step. The following type equation will illustrate the reaction:

$$6Mg(OH)_2+6Cl_2\rightarrow 5MgCl_2+Mg(ClO_3)_2+6H_2O.$$

Substantially all of the chlorine can thus be separated from the gas mixture without loss of chlorine dioxide. This mode of operation is described in an application filed August 15, 1934, by James F. White, Serial No. 739,938. This separation of chlorine from the gas mixture including chlorine and chlorine dioxide may also be effected as described in an application filed August 15, 1934, by George P. Vincent, Serial No. 739,941. The hydration of magnesium oxide from the 2nd step to form magnesium hydroxide may be carried out in any convenient manner. For example this hydration may be effected by boiling the magnesium oxide with water until hydration is complete or by heating the magnesium oxide with water or with steam at temperatures upwards of 100° C. under superatmospheric pressure or with steam at temperatures upwards of 100° C. under atmospheric pressure. The amount of magnesium hydroxide formed by hydration of the magnesium oxide produced in the 2nd step, after allowance for magnesium oxide normally required to neutralize the magnesium chloride solution produced in the 3rd step, exceeds that necessary for reaction in the 4th step with the chlorine of the gas mixture, including chlorine and chlorine dioxide, from the 3rd step. All or part of this excess magnesium hydroxide may be supplied to the 5th step through the 4th step or directly to the 5th step.

In the 5th step, chlorination of the magnesium hydroxide from the 2nd step, partly chlorinated in the 4th step, is completed. The following type equation will illustrate the reaction:

$$6Mg(OH)_2+6Cl_2\rightarrow 5MgCl_2+Mg(ClO_3)_2+6H_2O$$

This chlorination may be carried out in an aqueous solution or slurry in the conventional manner. Chlorine from the 2nd step and chlorine from an extraneous source are supplied to this chlorination, the amount of chlorine required to be supplied from an extraneous source corresponding to the amount of chlorine converted to chlorine dioxide plus the losses incurred in the combined operation. This chlorination advantageously is controlled so that the chlorinated liquor produced contains a total of about 31% (by weight) of magnesium chloride and magnesium chlorate and so that the final temperature attained in the chlorination approximates 60° C. After elimination of free chlorine and removal of sediment, in any conventional manner, this magnesium chloride—magnesium chlorate solution is supplied to the 1st step.

Figure 2:
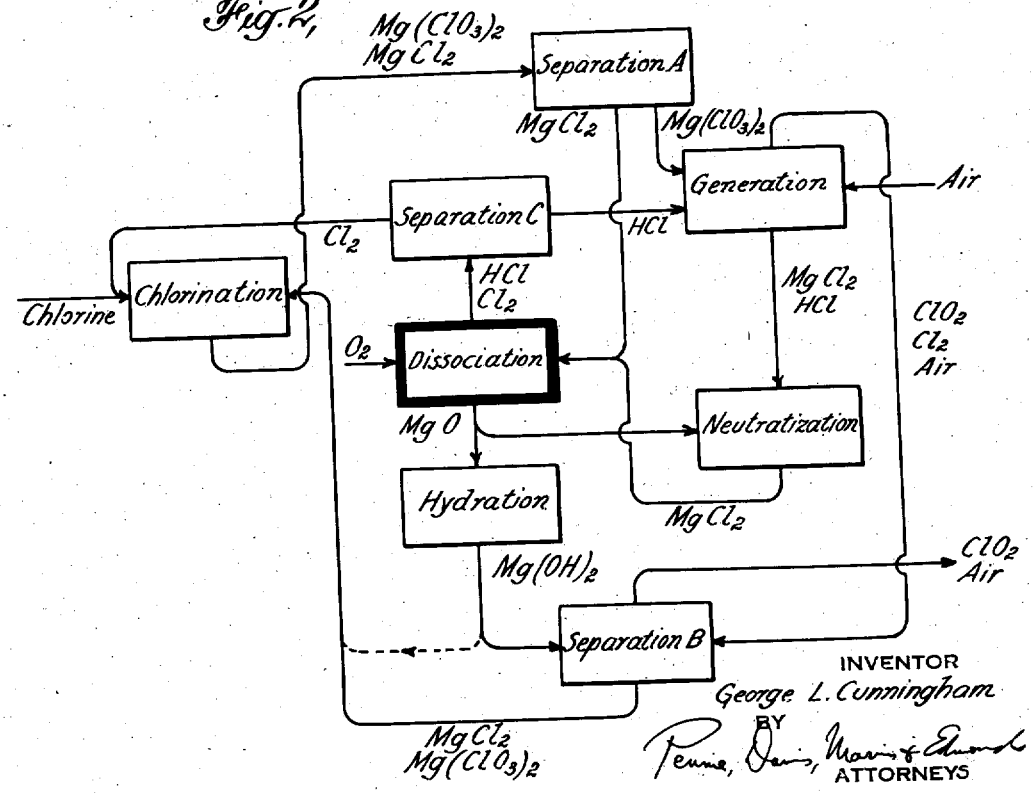

The invention is further illustrated by the accompanying drawing, in the form of flow sheets, in which Figure 1 is a simplified diagram of the combination of steps forming the process of the invention and in which Figure 2 is a somewhat more detailed diagram representing a process embodying the invention. The same legends are used to designate the same steps in Figure 1 and in Figure 2. Referring more particularly to Figure 2, the separation of hydrochloric acid from the gas mixture evolved in the 2nd step is the "separation C", the neutralization of free hydrochloric acid in the magnesium chloride solution from the 3rd step with magnesium oxide from the 2nd step is the "neutralization" and the hydration of magnesium oxide from the 2nd step for use in the 4th and 5th steps is the "hydration".

This invention comprises essentially the combination of the five steps above recited and illustrated in Figure 1 of the accompanying drawing. The steps forming this combination, severally, include other inventions, some inventions made by me and some inventions made by others associated with me in this connection.

I claim:

1. In the production of chlorine dioxide, the process which comprises separating magnesium chlorate and magnesium chloride from a mixture of the same, dissociating the separated magnesium chloride in the presence of free oxygen to form magnesium oxide, chlorine and hydrochloric acid, generating a gas mixture including chlorine and chlorine dioxide from the magnesium chlorate from the first-mentioned separation by reacting said magnesium chlorate with hydrochloric acid from said dissociation, separating chlorine from said gas mixture by reacting said gas mixture with magnesium hydroxide formed by hydration of magnesium oxide from said dissociation, chlorinating magnesium hydroxide formed by hydration of magnesium oxide from said dissociation together with magnesium chloride and magnesium chlorate formed in the second-mentioned separation to form a mixture of magnesium chlorate and magnesium chloride and supplying that mixture to the first-mentioned separation.

2. In the production of chlorine dioxide, the process which comprises separating magnesium chlorate and magnesium chloride from a mixture of the same, dissociating the separated magnesium chloride in the presence of free oxygen to form magnesium oxide, chlorine and hydrochloric acid, generating a gas mixture including chlorine and chlorine dioxide from the magnesium chlorate from the first-mentioned separation by reacting said magnesium chlorate with hydrochloric acid from said dissociation, returning magnesium chloride formed in said generation to said dissociation, separating chlorine from said gas mixture by reacting said gas mixture with magnesium hydroxide formed by hydration of magnesium oxide from said dissociation, chlorinating magnesium hydroxide formed by hydration of magnesium oxide from said dissociation together with magnesium chloride and magnesium chlorate formed in the second-mentioned separation to form a mixture of magnesium chlorate and magnesium chloride and supplying that mixture to the first-mentioned separation.

3. In the production of chlorine dioxide, the process which comprises separating magnesium chlorate and magnesium chloride from a mixture of the same, dissociating the separated magnesium chloride in the presence of free oxygen to form magnesium oxide, chlorine and hydrochloric acid, generating a gas mixture including chlorine and chlorine dioxide from the magnesium chlorate from the first-mentioned separation by reacting said magnesium chlorate with hydrochloric acid from said dissociation, returning magnesium chloride formed in said generation to said dissociation after neutralizing unreacted hydrochloric acid with magnesium oxide from said dissociation, hydrating the remaining magnesium oxide from said dissociation, separating chlorine from said gas mixture by reacting said gas mixture with magnesium hydroxide from said hydration, chlorinating magnesium hydroxide from said hydration together with magnesium chloride and magnesium chlorate formed in the second-mentioned separation to form a mixture of magnesium chlorate and magnesium chloride and supplying that mixture to the first-mentioned separation.

GEORGE LEWIS CUNNINGHAM.